United States Patent [19]

Kikinis

[11] Patent Number: 5,648,799
[45] Date of Patent: *Jul. 15, 1997

[54] LOW-POWER-CONSUMPTION MONITOR STANDBY SYSTEM

[75] Inventor: Dan Kikinis, Sunnyvale, Calif.

[73] Assignee: Elonex I.P. Holdings, Ltd., London, United Kingdom

[ * ] Notice: The term of this patent shall not extend beyond the expiration date of Pat. No. 5,389,952.

[21] Appl. No.: 591,775

[22] Filed: Feb. 7, 1996

Related U.S. Application Data

[63] Continuation of Ser. No. 319,256, Oct. 6, 1994, abandoned, which is a continuation of Ser. No. 141,413, Oct. 22, 1993, Pat. No. 5,389,952, which is a continuation of Ser. No. 984,370, Dec. 2, 1992, abandoned.

[51] Int. Cl.$^6$ ............... G09G 5/00; G09G 5/12; H04N 5/63
[52] U.S. Cl. ............ 345/212; 345/213; 348/730; 395/750
[58] Field of Search ............... 345/10, 211–213; 348/730, 734, 634; 364/707; 395/750; H04N 5/63

[56] References Cited

U.S. PATENT DOCUMENTS

| | | | |
|---|---|---|---|
| 3,453,601 | 7/1969 | Bogert et al. | 340/172.5 |
| 3,588,608 | 6/1971 | Halinski et al. | 317/31 |
| 3,941,989 | 3/1976 | McLaughlin et al. | 235/156 |
| 4,338,623 | 7/1982 | Asmus et al. | 358/22 |

(List continued on next page.)

FOREIGN PATENT DOCUMENTS

| | | |
|---|---|---|
| 0444997 | 9/1991 | European Pat. Off. . |
| 488384 | 6/1992 | European Pat. Off. . |
| 57-123598 | 8/1982 | Japan . |
| 60-090476 | 5/1985 | Japan . |
| 62-106523 | 5/1987 | Japan . |
| 62-216018 | 9/1987 | Japan . |

(List continued on next page.)

OTHER PUBLICATIONS

"Environmental Labelling of Display Units", Presented at the Third International Scientific Conference, Sep. 1992, pp. 1–4.
"Department of Energy Efficiency", NUTEK, Jun. 1992, pp. 1–8.
IBM Technical Disclosure Bulletin, "Increasing Lifetime and Reliability of CRT Displays", vol. 34, No. 9; Feb. 1992, pp. 281–283.
"Auto turn–off monitors", NUTEK, 1992, pp. 1–4.
EDGE: Work–Group Computing Report, Mar. 18, 1991 v2 n43, p. 28(1) Notebook Displays . . . author Phoenix Technologies Ltd. (Product Announcement).

(List continued on next page.)

*Primary Examiner*—Jeffery Brier
*Attorney, Agent, or Firm*—Donald R. Boys

[57] ABSTRACT

A system for managing power states for a video display monitor for a computer during periods of operator inactivity senses the presence or absence of signals provided to the video display monitor for forming an image on the monitor, such as red (R), green (G), blue (B) and horizontal synchronization (HSYNC) and vertical synchronization (VSYNC) signals. Time sensing apparatus at the host senses input inactivity, and in one embodiment suspends a signal provided to the monitor. Sensing and control circuits in the monitor sense the absence of the signal normally supplied to the monitor, and control power-using circuitry in the monitor in response. In an embodiment applicable to monitors having a microprocessor, the system may be incorporated entirely in software at the host and the monitor. In dumb monitors, the system requires add-in and/or add-on devices cooperating with software.

174 Claims, 6 Drawing Sheets

U.S. PATENT DOCUMENTS

| | | | |
|---|---|---|---|
| 4,404,500 | 9/1983 | Stow | 315/386 |
| 4,488,181 | 12/1984 | Haferl | 358/220 |
| 4,532,457 | 7/1985 | Haferl | 315/411 |
| 4,553,166 | 11/1985 | Sutton . | |
| 4,649,373 | 3/1987 | Bland et al. | 340/365 |
| 4,667,289 | 5/1987 | Yoshida et al. | 364/200 |
| 4,722,005 | 1/1988 | Ledenbach | 358/168 |
| 4,751,502 | 6/1988 | Ishii et al. . | |
| 4,806,784 | 2/1989 | Goda | 307/125 |
| 4,823,121 | 4/1989 | Sakamoto et al. | 340/781 |
| 4,922,448 | 5/1990 | Kunieda et al. | 364/900 |
| 4,980,836 | 12/1990 | Carter et al. | 364/483 |
| 5,021,983 | 6/1991 | Nguyen et al. | 364/707 |
| 5,055,940 | 10/1991 | Tomatsuri | 358/444 |
| 5,059,961 | 10/1991 | Cheng . | |
| 5,079,666 | 1/1992 | Najm . | |
| 5,089,754 | 2/1992 | George | 315/386 |
| 5,167,024 | 11/1992 | Smith et al. | 395/375 |
| 5,178,152 | 1/1993 | Ozawa | 128/680 |
| 5,226,122 | 7/1993 | Thayer et al. | 395/275 |
| 5,237,692 | 8/1993 | Raasch et al. | 395/725 |
| 5,245,312 | 9/1993 | Kiuchi et al. | 340/309.4 |
| 5,315,311 | 5/1994 | Honkala | 345/76 |
| 5,321,339 | 6/1994 | Hunt | 315/383 |
| 5,369,771 | 11/1994 | Gettel | 395/750 |
| 5,396,635 | 3/1995 | Fung | 395/800 |
| 5,423,045 | 6/1995 | Kannan et al. | 364/707 |
| 5,430,881 | 7/1995 | Ikeda | 364/707 |
| 5,457,801 | 10/1995 | Aihara | 364/707 |
| 5,471,621 | 11/1995 | Ohtsuki | 395/750 |
| 5,483,464 | 1/1996 | Song | 364/492 |

FOREIGN PATENT DOCUMENTS

| | | |
|---|---|---|
| 62-262250 | 11/1987 | Japan . |
| 62-276973 | 12/1987 | Japan . |
| 63-121365 | 5/1988 | Japan . |
| 2-24696 | 7/1988 | Japan . |
| 63-261229 | 10/1988 | Japan . |
| 1257893 | 10/1989 | Japan . |
| 2-24696 | 1/1990 | Japan . |
| 214871 | 1/1990 | Japan . |
| 2-053126 | 2/1990 | Japan . |
| 2-56620 | 2/1990 | Japan . |
| 2-280587 | 11/1990 | Japan . |
| 3-091798 | 4/1991 | Japan . |
| 3-105561 | 5/1991 | Japan . |
| 3-214871 | 9/1991 | Japan . |
| 3-238516 | 10/1991 | Japan . |
| 4-062614 | 2/1992 | Japan . |
| 4-095146 | 3/1992 | Japan . |
| 4-096811 | 3/1992 | Japan . |
| 4-107623 | 4/1992 | Japan . |
| 4-107624 | 4/1992 | Japan . |
| 4-140826 | 5/1992 | Japan . |
| 4-188972 | 7/1992 | Japan . |
| 4-195091 | 7/1992 | Japan . |
| 4-205020 | 7/1992 | Japan . |
| 4-245518 | 9/1992 | Japan . |
| 4-290388 | 10/1992 | Japan . |
| 4-344692 | 12/1992 | Japan . |
| 5-094163 | 4/1993 | Japan . |
| 9204394 | 6/1992 | Rep. of Korea . |
| WO89/06012 | 6/1989 | WIPO . |

OTHER PUBLICATIONS

PC Week, Feb. 11, 1991 v8 n6, p. 5(1) PS/2 L40SX packs design novelties . . . author Michael Caton.

"Who's Using Your Electricity When Your Not There", NUTEK, pp. 1–8.

"VESA PROPOSAL; 'Power Save' Mode:", Video Electronics Standards Association, 2150 North First Street, Suite 440, San Jose, CA 95131–2020.

"Monitors Sport Extra Features to Lure Users" InfoWorld Oct. 5, 1992, IDG Communications, Inc. (p. 397) Copyright 1992 (Abstract).

"Nanao to Introduce Low–Cost 15–inch Windows Monitor" PC Week vol. 9, No. 42, Oct. 19, 1992, Ziff–Davis Publishing Company (p. 30) Copyright 1992 (Abstract).

"Into the Station: Memorex Telex Releases the 1477 CX Color Display Station and the 1236 Line Printer" MIDRANGE Systems vol. 5, No. 14 Jul. 21, 1992 Cardinal Business Media Inc. (p. 57) Copyright 1992 (Abstract).

Paradise VGA Plus™ Card Manual appendix D, 1988.

IBM Personal System/2™ and Personal Computer BIOS Interface Technical Reference pp. 4–59 to 4–61 and 4–121 to 4–125, Apr. 1987.

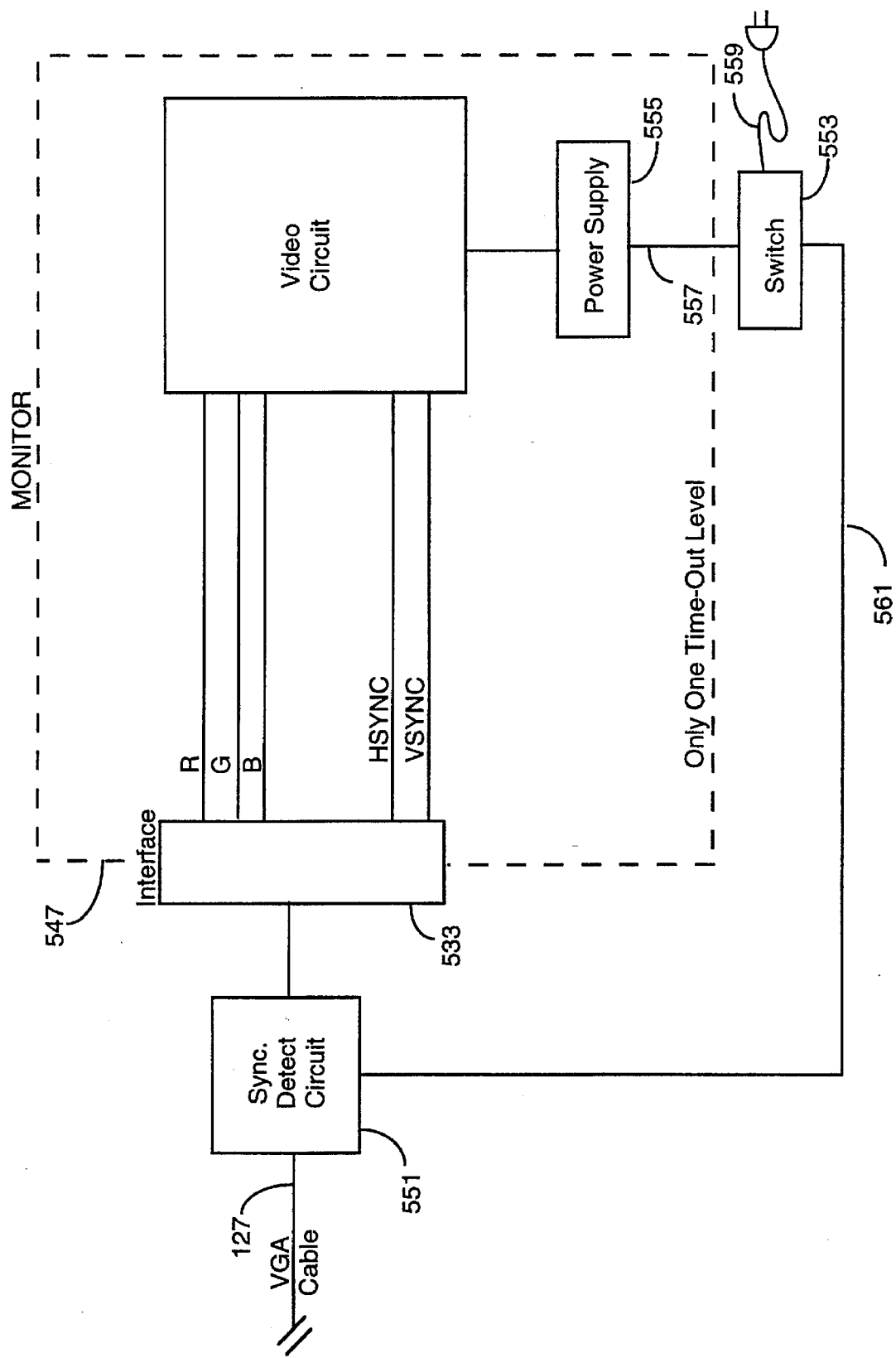

LOW-POWER-CONSUMPTION MONITOR STANDBY SYSTEM

This application is a continuation of patent application Ser. No. 08/319,256 filed Oct. 6, 1994, now abandoned, which is a continuation of patent application Ser. No. 08/141,413, filed Oct. 22, 1993, now U.S. Pat. No. 5,389,952, which is a continuation of application Ser. No. 07/984,370, filed Dec. 2, 1992, now abandoned.

FIELD OF THE INVENTION

The present invention is in the field of automatic power saving devices and pertains in particular to reduction of power consumption by computer video monitors.

BACKGROUND OF THE INVENTION

A typical color video monitor may consume as much as 50 to 80 percent of the total electrical energy consumed by a personal computer (PC). A video monitor dissipates this energy as visible light emissions from screen phosphors, thermal waste, electromagnetic radiation, high-energy radiation and acoustic energy. Only the phosphor emissions are normally considered useful and then only when actively being watched by an observer. The radiation emissions have been a hotly debated source of concern regarding possible health rusks from long-term exposure. Manufacturers incur considerable extra expense to reduce radiation emissions from video monitors. Some people are annoyed by the acoustic emissions produced by some monitors. Thermal losses from video monitors contribute an additional load on air conditioning equipment. The energy efficiency of video monitors has historically improved mostly as a result of advances in the electronic circuit components such as the increased use of integrated circuit (IC) devices. Cathode ray tube, (CRF) technology has improved rather little in terms of energy efficiency.

The number of PC's in regular use is growing rapidly and has reached a point where they have become major consumers of electric power. The United States Environmental Protection Agency has issued power efficiency targets for computer manufacturers to design for in new systems. Low-voltage IC's use less energy, and microprocessor power management techniques allow a computer to reduce energy consumption when idling. Until a suitable replacement for the CRT or a more efficient CRT is developed it will be difficult to substantially improve personal computer energy efficiency.

What is needed is a way to shut down high-energy-consuming circuits in the video monitor when the computer determines that the display may be of no interest to anyone. This might be determined by a period of inactivity on input devices such a modem, mouse and keyboard. Many computers and video terminals use such a technique to activate a screen blanking circuit or a program that displays moving images (or no image) to avoid burning the screen phosphors. Activating an input device such as pressing a key or moving a mouse causes the previous screen image to be restored. This technique can be extended to reduce video monitor power consumption by signaling the microcontroller found in many recent design monitors, or an add-on device for "dumb" monitors, to shut down or restore some or all of the monitor's electrical power circuits. One key to accomplishing this end is a means of signalling a monitor to shut down to some selected level without adding to the signals presently provided to a monitor.

SUMMARY OF THE INVENTION

In an embodiment of the present invention a system is provided for a general purpose computer having a CPU, a memory means, a monitor, and video signal means for providing horizontal sync (HSYNC) and vertical sync (VSYNC) signals to the monitor, to signal the monitor to assume alternative states. The system comprises timing means for measuring periods of inactivity configured to reset to zero on input interrupts and to provide overflow signals at preset overflow values, and sync disabling means for interrupting at least one of the HSYNC and VSYNC signals to the monitor according to overflow states of the timing means.

In one embodiment the video signal means comprises video adapter circuitry having a VSYNC generator and an HSYNC generator, and the disabling means comprises a register associated with the video adapter circuitry, wherein one bit in the register is a vertical retrace polarity bit, and another bit is a horizontal retrace polarity bit. The timing means is provided by the CPU following a monitor power management instruction routine stored in the memory means, and SYNC signals are disabled by the CPU writing to the register. The monitor power management routine may be stored in the system BIOS.

In an alternative embodiment the system is implemented by an add-in time-out controller with sensing means for sensing user input interrupts, and the disabling means comprises at least one switch operable by the time-out controller and placed in a line carrying one of the HSYNC and VSYNC signals. In yet another alternative the system may be accomplished by an add-on (external) time-out controller connected to interface devices at the ports where user input devices are connected. The interface devices monitor input interrupts, and the add-on time-out controller is connected to an interrupt device at the monitor port for interrupting SYNC signals. In another aspect the invention involves a CRT monitor configured to respond to power level signals from a host computer. The monitor comprises a SYNC detector for monitoring the presence of VSYNC and HSYNC signals from the host, and power level control means for shutting down power circuitry ill the CRT monitor in response.

In yet another aspect a power system for a monitor is provided with an external SYNC detector placed in the monitor cable to the host. This controller drives a switch that controls AC mains power to the monitor.

A computer system according to the invention comprises tinting means configured to reset to zero on system interrupts, SYNC disabling means for interrupting SYNC signals to a monitor, SYNC detector means associated with the monitor for sensing the presence of SYNC signals at the monitor, and power level control means associated with the monitor for shutting down power-using circuitry in the monitor in response to the presence of SYNC signals.

In yet another aspect a method is provided for saving power for a video display monitor comprising steps of sensing input interrupts from user operated devices, resetting a timer to zero on receipt of such interrupts, providing a first power level signal to the monitor based on disabling at least one of a VSYNC and an HSYNC signal to the monitor, providing a second power level signal in a different configuration than for the first power level signal, sensing presence of the SYNC signals at the monitor, and shutting down power circuitry in response to the power level signals. A cathode heater is left on for presence of the first signal, and power is shut off completely in response to receipt of the second signal.

The present invention in these several aspects provides a way to save power at a monitor, and minimize radiation

3 emissions as well, in response to periods of inactivity, utilizing to a great extent, existing elements and capabilities of a general-purpose computer.

BRIEF DESCRIPTION OF THE DRAWINGS

FIG. 5 is a largely schematic representation of an add-on device for controlling AC primary power to a monitor according to another alternative embodiment of the present invention.

DESCRIPTION OF THE PREFERRED EMBODIMENTS

Figure 1:
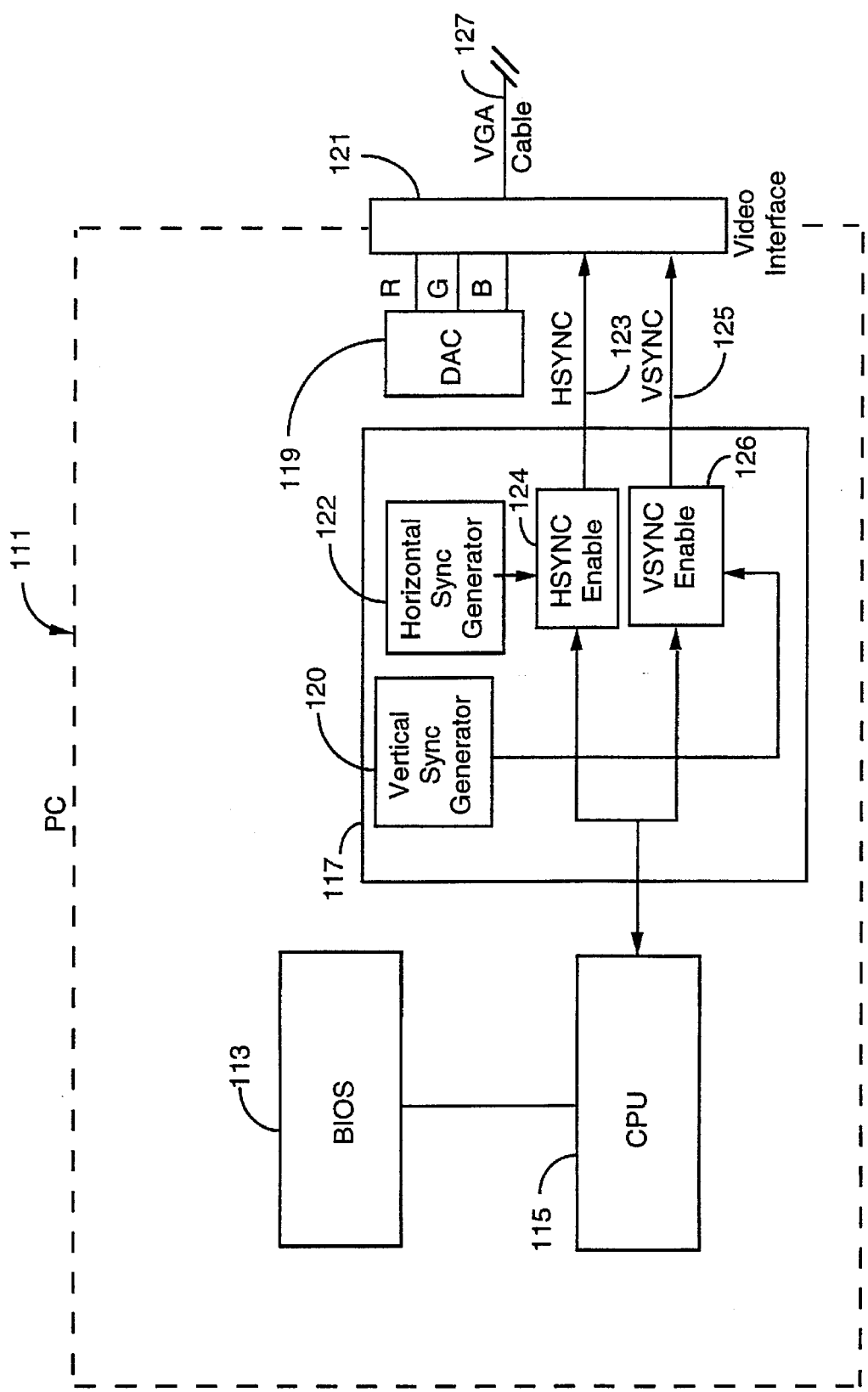
FIG. 1 is a largely schematic representation of a PC according to an embodiment of the present invention.

FIG. 1 shows the functional elements of a preferred embodiment of the present invention capable of providing 3 distinct signals to a monitor to signal the monitor to adjust to as many as three states. In an embodiment of the invention, the states are selected levels of monitor power management (MPM). The signal to the monitor is based on interrupting one or the other or both HSYNC and VSYNC signals. In the embodiment shown in FIG. 1 a PC 111 comprises a Basic Input Output System (BIOS) 113 and a Video Graphics Adapter (VGA) 117. The invention will work equally well with other video adapters, as virtually all such adapters employ HSYNC and VSYNC signals. In some other adapters, equivalent means of interrupting the HSYNC and VSYNC signals would be used.

BIOS 113 includes instructions for MPM, which can cause a central processing unit (CPU) 115 to change the state of sync-enable controls in VGA 117. In alternative embodiments instructions for implementing MPM might be embedded in operating system (OS) device driver routines or Terminate and Stay Resident (TSR) programs.

The MPM instructions monitor CPU 115 interrupts for input devices (not shown) such as the timer, keyboard and serial communication ports. MPM instructions advance a time-out counter on each timer interrupt and reset the count to an initial value on each monitored interrupt. The initial value of the MPM time-out counter may be fixed or adjustable. When the MPM time-out counter reaches a preset overflow value, due to cessation of monitored interrupts, instructions are executed that change the state of HSYNC Enable 124 and VSYNC Enable 126 control to disable output of horizontal synchronization signals (HSYNC) 123, produced by horizontal sync generator 122, and/or vertical synchronization signals (VSYNC) 125, produced by vertical sync generator 120, or both. A subsequent monitored interrupt causes execution of instructions that change the state of HSYNC Enable 124 and VSYNC Enable 126 control circuits to enable output of HSYNC 123 and VSYNC 125 signals from VGA 117.

In the case of a VGA controller, the enable/disable capability is through writing by the CPU into register 3C2 of the controller, wherein bits 6 and 7 are reserved for horizontal retrace polarity, and vertical retrace polarity, respectively. HSYNC 123 and VSYNC 125 and color signals are transmitted to the monitor via a VGA cable 127. The pin-out for the signals on a VGA cable is well-known, and is shown in IBM Personal System/2, Model 80 Technical Reference, published by IBM in 1987.

Figure 2A:
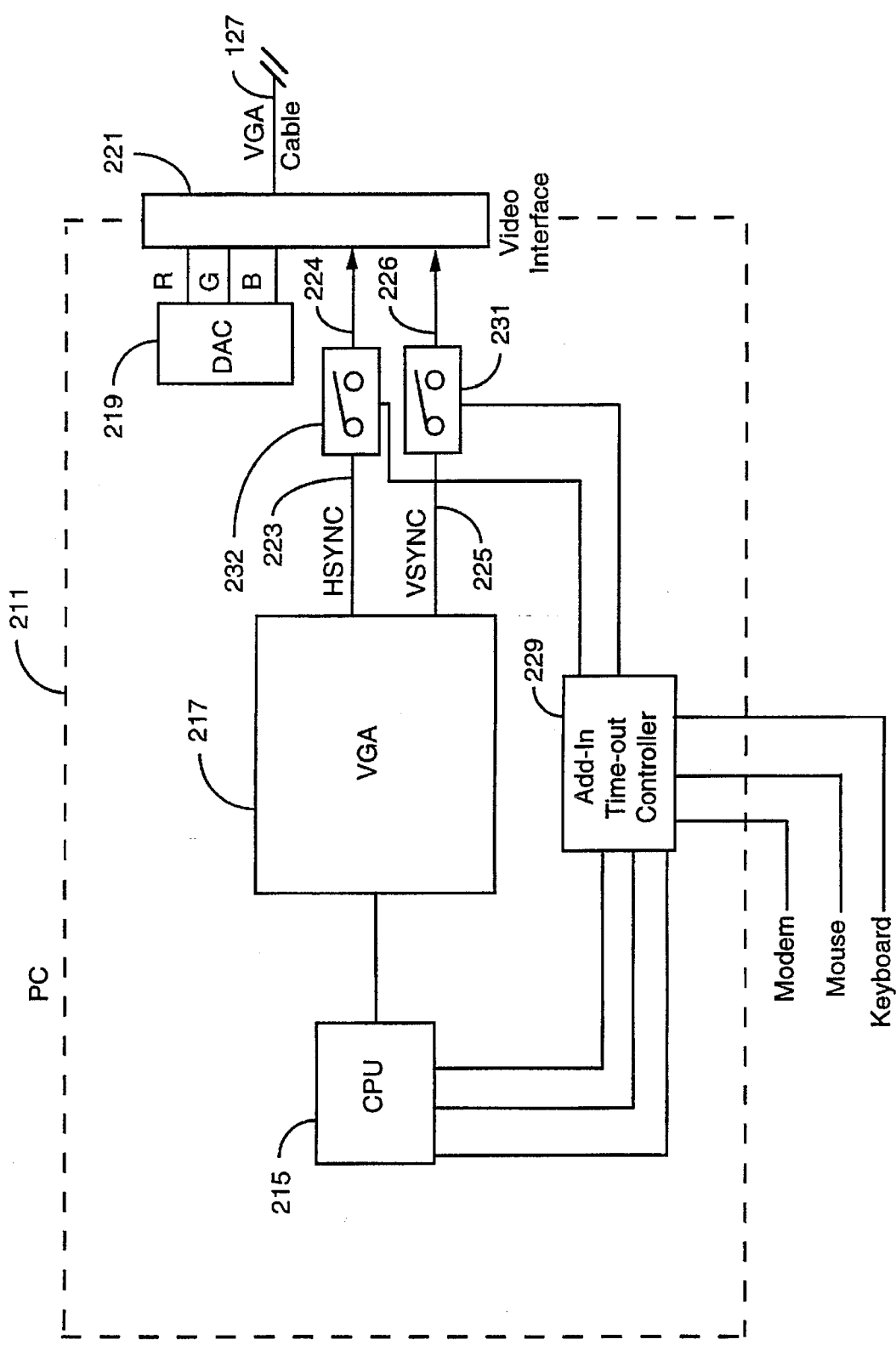
FIG. 2A is a largely schematic representation of a PC enhancedly an add-on device according to an alternative embodiment of the present invention.

In an alternative embodiment, shown in FIG. 2A, useful for refitting existing computers, a current art PC 211 having a CPU 215 is enhanced by installation of a switch 231, which connects between a VGA 217 VSYNC output 225 and VSYNC input 226 to a video interface 221. In a color computer, R, G, and B signals are brought to interface 221 from DAC 219. An add-in time-out controller 229 comprising MPM instructions monitors input device activity as described above for FIG. 1. Time-out of all input devices causes instructions to be executed which change the state of program-controlled switch 231, blocking VSYNC input 225 to video interface 221. Resumption of monitored interrupts causes switch 231 to close, returning the VSYNC signals to line 226. A second switch 232 may be used in the HSYNC line to interrupt the HSYNC signals to line 224, and, in this embodiment, the add-in time-out controller controls both switches. In yet another alternative, one switch may be used to interrupt both HSYNC and VSYNC signals.

The functional blocks presented in FIG. 2A are an internal solution to an add-in hardware/software embodiment, and the blocks are not intended to be taken literally as hardware devices and interfaces. It will be apparent to one with skill in the art that there are many equivalent ways the functional blocks might be accomplished. The keyboard, mouse, and modem inputs are monitored by the add-in controller, and are made available as well to the CPU in the typical manner.

Figure 2B:
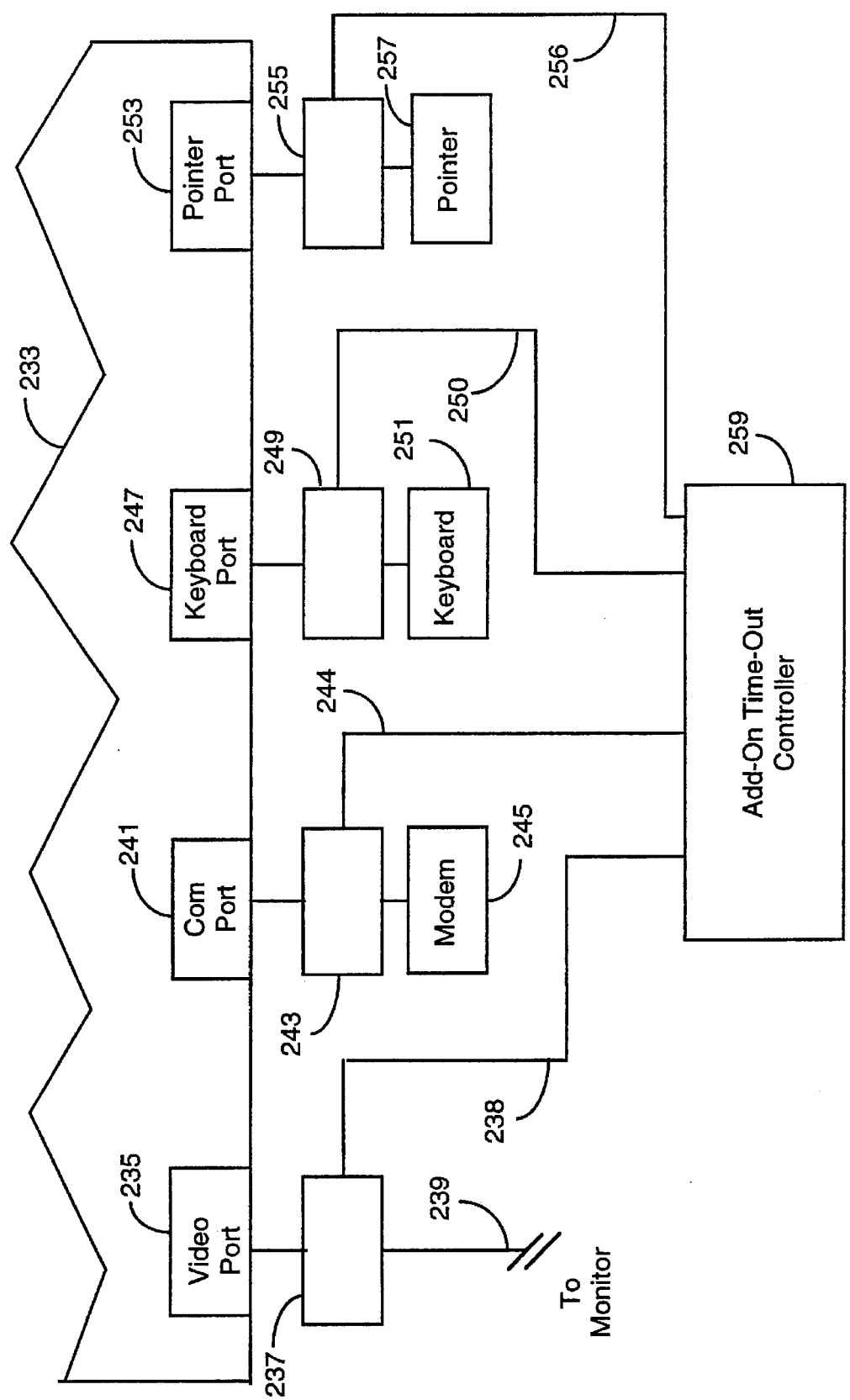
FIG. 2B is a largely schematic representation of a PC enhanced by an add-in device according to another alternative embodiment.

FIG. 2B shows an external solution for a hardware/software embodiment. In this solution an add-on time-out controller 259 is external to the computer system 233, and each port that supports an input device and the video output port is fitted with an interface device connected to the add-on time-out controller. For example, interface 243 at COM port 241 used for a modem 245 monitors modem activity and reports to controller 259 on line 244. Interface 249 at keyboard port 247 monitors keyboard 251 activity and reports to controller 259 on line 250. Interface 255 at pointer port 253 monitors pointer 257 activity (mouse, joystick, trackball), and reports to controller 259 on line 256.

In this embodiment controller 259 accomplishes the timer functions and outputs signals on line 238 to interface device 237 at video port 237. Line 239 goes to the monitor. Device 237 interrupts HSYNC and VSYNC signals according to the overflow states of add-on controller 259.

Figure 3:
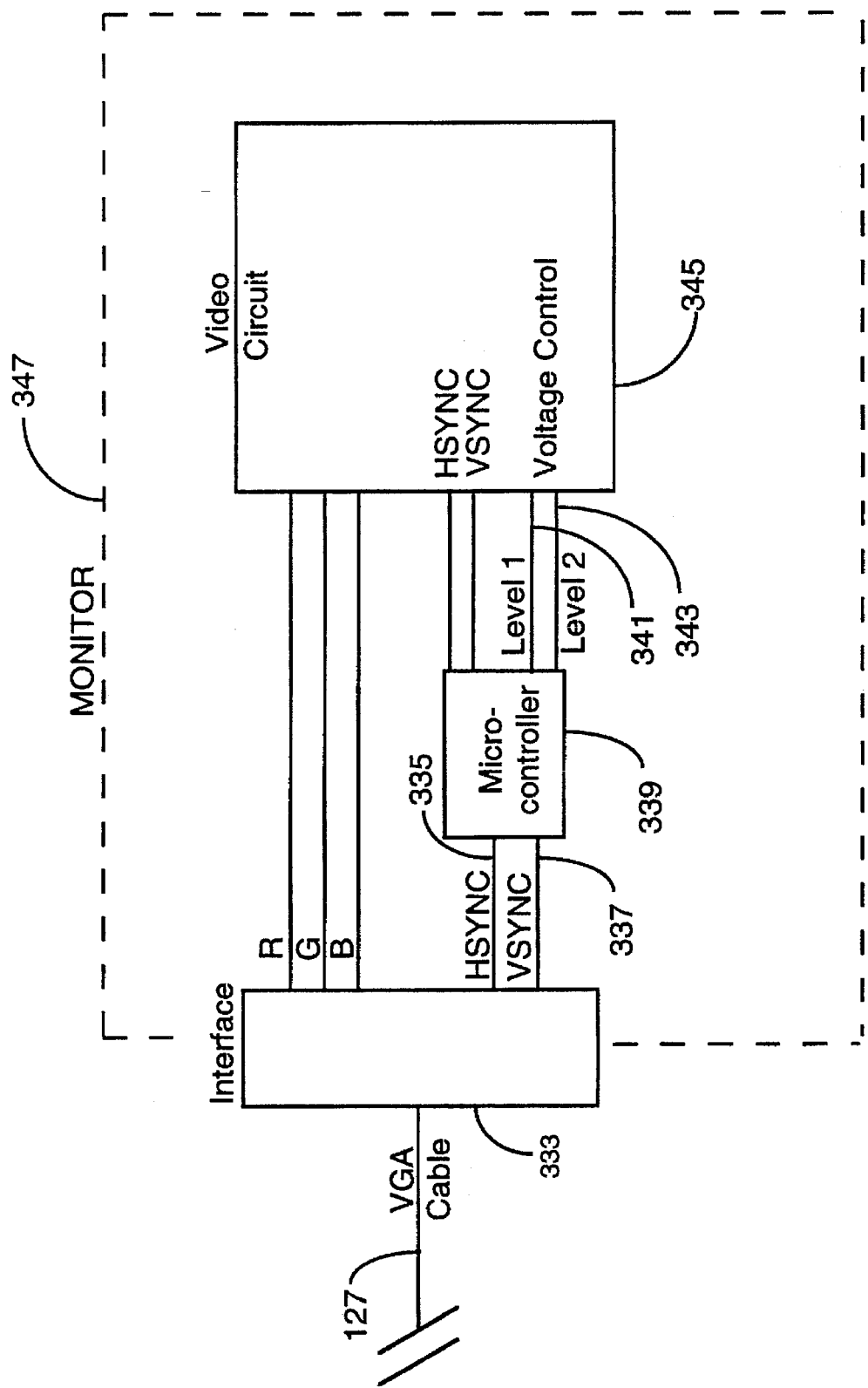
FIG. 3 is a largely schematic representation of a microcontroller-based video monitor according to an embodiment of the present invention.

A color video monitor 317 according to an embodiment of the present invention is shown in FIG. 3. Monitor 347 comprises a interface 333, a microcontroller 339 having MPM instructions according to the present invention and a video circuit (VC) 345 having voltage control circuits. Interface 333 separates a video signal, received through VGA cable 127, into color signals, HSYNC pulses 335 and VSYNC pulses 337. Microcontroller 339 monitors the HSYNC signal 335 and HSYNC signal 337. The MPM instructions described above count the number of HSYNC pulses occurring between each pair of VSYNC pulses. Zero HSYNC pulses counted causes the MPH instructions in microcontroller 339 to change the voltage or, Level-2 signal line 343. Similarly, an interval count of HSYNC 335 pulses greatly in excess of the maximum video scan rate for monitor 347, indicating a loss of VSYNC 337, causes microcontroller 339 to change the voltage on Level-1 signal line 341. Resumption of HSYNC 335 to VSYNC 337 pulse interval counts to a range from the minimum to the maximum scan rate causes MPM instructions in microcontroller 339 to restore quiescent voltage levels to Level-1 signal line 341 and Level-2 signal line 343.

When video circuit 345 senses an active volt age level on Level-1 signal line 341, it cuts off power to all circuits in monitor 347 except microcontroller 339, interface 333, and video circuit 345 power-control circuits (not shown). In this level 1 standby mode, power consumption of monitor 347 is reduced by more than 90 percent. If monitor 347 remains in level 1 standby for mope than a few seconds, full warm-up time is required to reactivate it. An active voltage level on level-2 signal line 343 causes video circuit 315 to cut off power to all circuits except those described above plus the CRT cathode heater. In level 2 standby mode monitor 347 power consumption is reduced by 80 to 90 percent. Because the CRT is kept hot, reactivating monitor 347 from level 2 standby requires about 5 seconds or less. Reactivation of monitor 347 occurs when voltage on Level-1 signal line 341 and Level-2 signal line 343 returns to the quiescent state allowing video circuit 345 to activate power to all circuits of monitor 347.

Figure 4:
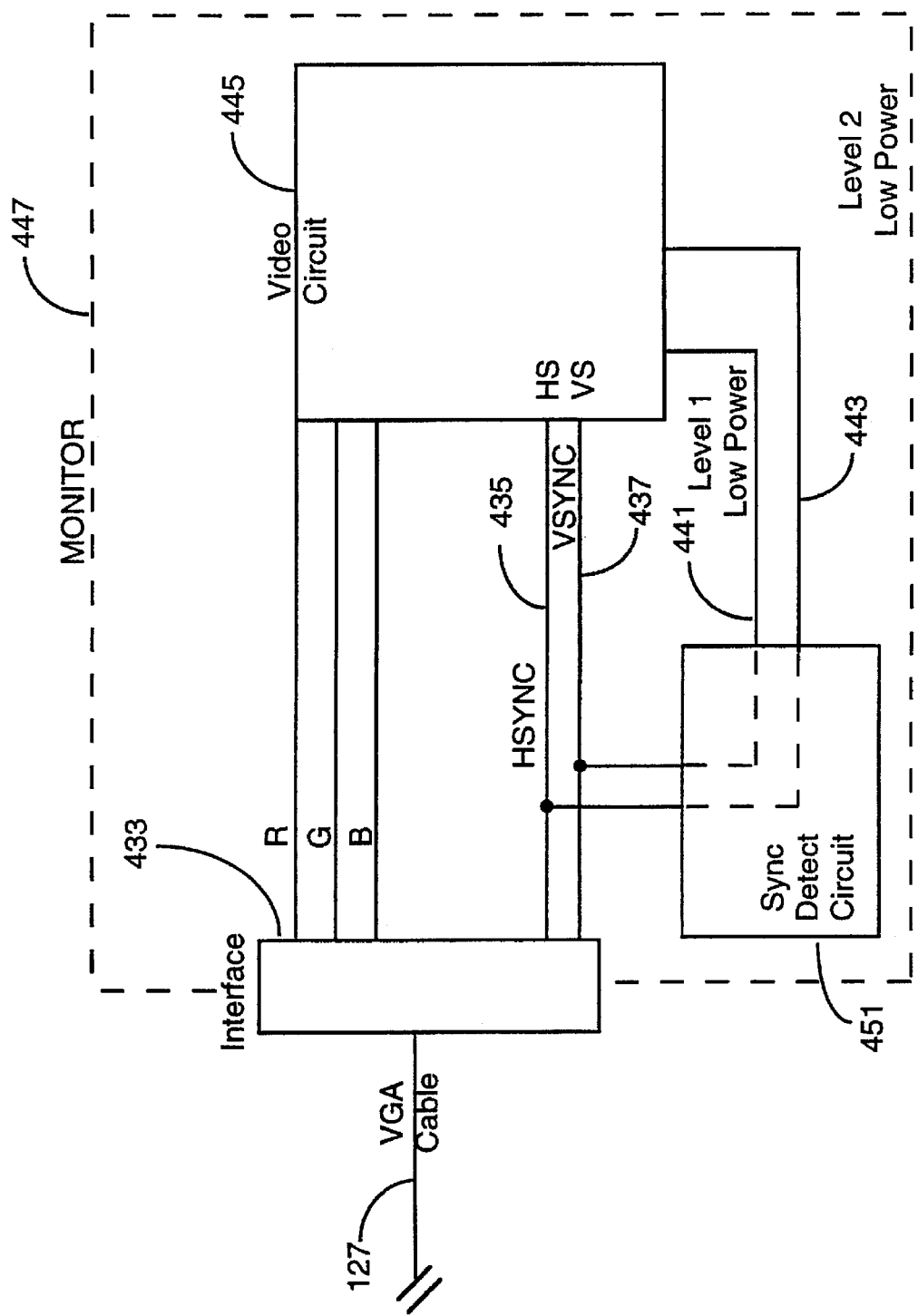
FIG. 4 is a largely schematic representation of a "dumb" monitor equipped with an add-in device according to an alternative embodiment of the present invention.

FIG. 4 shows an alternative embodiment of the present invention in a monitor 447 with video circuits functionally similar to those described for the monitor shown in FIG. 3, including an interface 433 and a video circuit 445, but without a microcontroller. A sync detect circuit 451 compares pulse intervals for HSYNC 435 and VSYNC 437 against time-constants of adequate duration to allow for brief interruptions of sync pulses. Loss of HSYNC 435 pulses or VSYNC 437 pulses for periods longer than the associated time-constants causes sync detector circuit 451 to change Level-1 signal line 441 or Level-2 signal line 443 voltage to its active state as described for FIG. 3 and with the same results. Similarly, resumption of HSYNC 435 and VSYNC 437 pulses reactivates monitor 447 as described for FIG. 3 above.

FIG. 5 shows another alternative embodiment of the present invention suitable for add-on use with a monitor 547 having an interface 533. A sync detect circuit 551, in an external enclosure having pass-through connections, inserts into VGA cable 127. Sync detect circuit 551 monitors video signals on VGA cable 127 and compares the SYNC interval for one or the other of VSYNC and HSYNC to a time-constant in a manner similar to that described for FIG. 4 above. Loss of the monitored SYNC signal in VGA cable 127 for an interval longer than the time-constant. causes sync detect circuit 5521 to change the voltage on power-control line 561 to its active level, which in turn causes an electronically-controlled switch 553 to open. Electronically-controlled switch 553 controls AC primary power from an electrical cord 559 to a receptacle for monitor 547 power supply cord 557. When electronically-controlled switch 553 opens, AC power to a D(; power supply 555 is lost, thus causing total shutdown of monitor 517. Resumption of SYNC signals in VGA cable 127 video signal causes sync detect circuit 551 to change power-control line 561 to its quiescent state, thus causing electronically-controlled switch 553 to close, which restores AC power input to DC power supply 555 reactivating monitor 547.

It will be apparent to one with skill in the art that there are many changes that might be made without departing from the spirit and scope of the invention. Some of these alternatives have already been described, such as MPM instructions implemented in an OS device driver or TSR routines instead of the BIOS, single-level MPM instead of two-level MPM and an external video monitor power control device. Other methods of signaling MPM state changes to a monitor might include time-based coded sequences of frequency changes in HSYNC or VSYNC, coded values in the color signals, or no color signal for an extended period. Alternative embodiments of MPM routines might allow an operator to control MPM operation through command steps, such as menus, dialog boxes or command lines. Such controls might include shutting down monitor power at will by pressing a "hot key", typing a command line or other program interface step. Other features might allow the operator to change the idle time required to trigger MPM and toggle MPM monitoring on or off. Alternative NPM routines might also require an operator to type a password before enabling the transmission of normal video signals to the video monitor. Alternative devices for both built-in and post-manufacture modification to implement monitor power control might be devised. Embodiments of the present invention for monochromatic and grey-scale video adapters and monitors are also contemplated.

What is claimed is:

1. In a computer having a central processing unit (CPU), a memory, input apparatus, a display monitor, and a video adapter for providing several signals to the display monitor to provide an image on the display monitor, a power management system for managing power usage by the display monitor, comprising:

a timer for detecting periods of inactivity of the input apparatus;

a signal interrupter; and a power manager circuit in the display monitor;

wherein, after passage of a pre-stored time period of inactivity of the input apparatus, the timer signals the signal interrupter to interrupt one of the several signals to the display monitor as a power management command, and the power management circuit in the display monitor causes the display monitor to assume either one of at least two reduced-power states in response to the power management command.

2. A power management system as in claim 1 wherein the several signals include a horizontal sync (HSYNC) and a vertical sync (VSYNC) signal, and the interrupted signal is one, but not both, of the HSYNC and the VSYNC signals.

3. A power management system as in claim 1 wherein the several signals provided to the display monitor include at least one color video signal, and the interrupted signal is a color video signal.

4. A power management system as in claim 1 wherein the timer comprises control routines executed by the CPU, and the interrupter comprises the CPU signaling the video adapter to disable one of the several signals provided to the display monitor.

5. A power management system as in claim 4 wherein the control routines are provided as part of a system basic input output system (BIOS) stored in a programmable read-only memory.

6. A power management system as in claim 1 wherein the timer and the signal interrupter form an add-in time-out controller adaptable to existing conventional computer circuitry, and the signal interrupter includes an electrically-operable switch in a line carrying one of the several signals provided by the video adapter to the display monitor, the electrically-operable switch operable by a signal from the timer.

7. A power management system as in claim 1 wherein the power manager circuit in the display monitor comprises detection circuitry for monitoring one of the several incoming signals provided for forming an image on the display monitor, and control circuitry for controlling power use by circuitry other than the power manager circuit in response to interruption of one of the several incoming signals.

8. A power management system as in claim 7 wherein power is reduced but not suspended to circuitry other than the power manager circuit in response to interruption of one of the several signals provided to the display monitor for providing an image on the display monitor.

9. A power management system as in claim 7 wherein the circuitry other than the power manager comprises a filament heater circuit.

10. A power management system as in claim 7 wherein the several signals to the display monitor include an HSYNC and a VSYNC signal, and power is reduced to circuitry other than the power manager circuit in response to interruption of one of the HSYNC and the VSYNC signals.

11. A power management system as in claim 1 wherein the input apparatus comprises one or more of a keyboard, a modem, and a pointer device, the timer comprises add-on circuitry connected to sensing devices interfaced at input ports for the input apparatus, and the signal interrupter comprises add-on switching circuitry including at least one electrically-operable switch interfaced to an output port for the several signals provided by the video adapter to the display monitor, wherein the at least one electrically-operable switch is in a line carrying one of the several signals provided by the video adapter to the display monitor.

12. A power management system as in claim 11 wherein the signal interrupter comprises more than one electrically-operable switch in more than one line carrying one of the several signals provided by the video adapter to the display monitor, and wherein the timer signals the signal interrupter to operate the electrically-operable switches in different combinations in response to different lengths of time of inactivity of the input apparatus, the different lengths of time measured from a common beginning.

13. The power management system of claim 1 wherein there are two reduced-power states, one of the reduced-power states is off, and the other reduced-power state is an intermediate state between full power and off.

14. The power management system of claim 13 wherein in said intermediate reduced-power state, power is supplied substantially only to the power manager circuit.

15. The power management system of claim 13 wherein the power-using circuitry includes a filament heater, and in said intermediate reduced-power state partial power is supplied to the filament heater.

16. The power management system of claim 1 wherein there are two reduced-power states, and both are intermediate states between full power and off.

17. The power management system of claim 16 wherein the power-using circuitry includes a filament heater, in one of the reduced-power states power is supplied substantially only to the power manager circuit, and in the other reduced power state partial power is supplied to the filament heater.

18. The power management system of claim 1 wherein the power manager circuit reduces power to power-using circuitry in the monitor to three reduced-power states.

19. The power management system of claim 18 wherein one of said three reduced-power states is off and two of said reduced-power states are intermediate states between full power and off.

20. The power management system of claim 19 wherein the monitor includes a filament heater and in one of the intermediate states partial power is supplied to the filament heater.

21. The power management system of claim 19 wherein in one of the intermediate states power is supplied substantially only to the power manager circuit.

22. The power management system of claim 19 wherein the monitor includes a filament heater, in one of the reduced-power states partial power is supplied to the filament heater, and in the other reduced-power state power is supplied substantially only to the power manager circuit.

23. In a computer system having a CPU, a memory, peripheral devices, a display monitor, and a video circuit providing signals to the display monitor, a power-management system comprising:

a timer;

an interrupter circuit coupled to the signals to the display monitor; and a power manager circuit associated with the display monitor;

wherein the timer resets and restarts on activity of the peripheral devices, the interrupter circuit interrupts the signals in different combinations as power-management commands to the display monitor in response to the timer reaching different preset time constants, and the power manager circuit directs the display monitor to assume individual ones of alternative reduced-power states in response to the different combinations of interrupted video signals.

24. A power-management system as in claim 23 wherein the display monitor has a filament heater, and power is reduced but not suspended to the filament heater in one of the reduced-power states.

25. A power-management system as in claim 24 wherein the power-manager circuit associated with the monitor determines a signal is interrupted after passage of a predetermined time period with no valid signal present.

26. The power-management system of claim 23 wherein there are two reduced-power states, one of the reduced-power states is off, and the other reduced-power state is an intermediate state between full power and off.

27. The power-management system of claim 26 wherein in said intermediate reduced-power state, power is supplied substantially only to the power manager circuit.

28. The power-management system of claim 26 wherein the power-using circuitry includes a filament heater, and in said intermediate reduced-power state partial power is supplied to the filament heater.

29. The power-management system of claim 23 wherein there are two reduced-power states, and both are intermediate states between full power and off.

30. The power-management system of claim 29 wherein the power-using circuitry includes a filament heater, in one of the reduced-power states power is supplied substantially only to the power manager circuit, and in the other reduced power state partial power is supplied to the filament heater.

31. The power-management system of claim 23 wherein the power manager circuit reduces power to power-using circuitry in the monitor to three reduced-power states.

32. The power-management system of claim 31 wherein one of said three reduced-power states is off and two of said reduced-power states are intermediate states between full power and off.

33. The power-management system of claim 32 wherein the monitor includes a filament heater and in one of the intermediate states partial power is supplied to the filament heater.

34. The power-management system of claim 32 wherein in one of the intermediate states power is supplied substantially only to the power manager circuit.

35. The power-management system of claim 32 wherein the monitor includes a filament heater, in one of the reduced-power states partial power is supplied to the filament heater, and in the other reduced-power state power is supplied substantially only to the power manager circuit.

36. In a computer system having a CPU, a memory, peripheral devices, a display monitor, and a video circuit providing signals to the display monitor, a power-management system comprising:

a timer;

an interrupter circuit coupled to the signals to the display monitor; and a power manager circuit associated with the display monitor;

wherein the timer resets and restarts on activity of the peripheral devices, the interrupter circuit interrupts the signals to the display monitor in a specific combination as a power-management command to the display monitor in response to the timer reaching a preset time constant, and the power manager circuit directs the display monitor to assume one or another of at least two alternative reduced-power states in response to the power-management command to the display monitor.

37. A power-management system as in claim 36 wherein the display monitor has a filament heater, and power is reduced but not suspended to the filament heater in one of the reduced-power states.

38. A power-management system as in claim 37 wherein the power-manager circuit associated with the monitor determines a signal is interrupted after passage of a predetermined time period with no valid signal present.

39. The power-management system of claim 36 wherein there are two reduced-power states, one of the reduced-power states is off, and the other reduced-power state is an intermediate state between full power and off.

40. The power-management system of claim 39 wherein in said intermediate reduced-power state, power is supplied substantially only to the power manager circuit.

41. The power-management system of claim 39 wherein the power-using circuitry includes a filament heater, and in said intermediate reduced-power state partial power is supplied to the filament heater.

42. The power-management system of claim 36 wherein there are two reduced-power states, and both are intermediate states between full power and off.

43. The power-management system of claim 42 wherein the power-using circuitry includes a filament heater, in one of the reduced-power states power is supplied substantially only to the power manager circuit, and in the other reduced power state partial power is supplied to the filament heater.

44. The power-management system of claim 36 wherein the power manager circuit reduces power to power-using circuitry in the monitor to three reduced-power states.

45. The power-management system of claim 44 wherein one of said three reduced-power states is off and two of said reduced-power states are intermediate states between full power and off.

46. The power-management system of claim 45 wherein the monitor includes a filament heater and in one of the intermediate states partial power is supplied to the filament heater.

47. The power-management system of claim 45 wherein in one of the intermediate states power is supplied substantially only to the power manager circuit.

48. The power-management system of claim 45 wherein the monitor includes a filament heater, in one of the reduced-power states partial power is supplied to the filament heater, and in the other reduced-power state power is supplied substantially only to the power manager circuit.

49. In a computer system having a CPU, a memory, peripheral devices, a display monitor, and video circuitry for providing signals to the display monitor, a power management system for managing power usage by the monitor, comprising:

a timer for detecting periods of inactivity of the peripheral devices;

an interrupter circuit configured to interrupt at least one of the signals provided by the video circuitry to the display monitor in response to detecting of said periods of inactivity; and a power manager circuit associated with the monitor and adapted to selectively power circuits in the monitor in response to interruption of one of the signals provided by the video circuitry to the display monitor, the power manager circuit including circuitry for monitoring the incoming signals provided by the video circuitry, and for reducing power use by circuitry other than the power manager to either one of at least two reduced-power states in response to interruption of one or more of the signals provided to the display monitor, the circuitry other than the power manager including a filament heater.

50. A power management system as in claim 49 wherein the signals provided to the display monitor include HSYNC and VSYNC signals, and the interrupter circuit interrupts one or both of the HSYNC and VSYNC signals.

51. The power-management system of claim 49 wherein there are two reduced-power states, one of the reduced-power states is off, and the other reduced-power state is an intermediate state between full power and off.

52. The power-management system of claim 51 wherein in said intermediate reduced-power state, power is supplied substantially only to the power manager circuit.

53. The power-management system of claim 51 wherein the power-using circuitry includes a filament heater, and in said intermediate reduced-power state partial power is supplied to the filament heater.

54. The power-management system of claim 49 wherein there are two reduced-power states, and both are intermediate states between full power and off.

55. The power-management system of claim 54 wherein the power-using circuitry includes a filament heater, in one of the reduced-power states power is supplied substantially only to the power manager circuit, and in the other reduced power state partial power is supplied to the filament heater.

56. The power-management system of claim 49 wherein the power manager circuit reduces power to power-using circuitry in the monitor to three reduced-power states.

57. The power-management system of claim 56 wherein one of said three reduced-power states is off and two of said reduced-power states are intermediate states between full power and off.

58. The power-management system of claim 57 wherein the monitor includes a filament heater and in one of the intermediate states partial power is supplied to the filament heater.

59. The power-management system of claim 57 wherein in one of the intermediate states power is supplied substantially only to the power manager circuit.

60. The power-management system of claim 57 wherein the monitor includes a filament heater, in one of the reduced-power states partial power is supplied to the filament heater, and in the other reduced-power state power is supplied substantially only to the power manager circuit.

61. In a computer system having a host computer with a central processing unit (CPU), a memory, and input apparatus, and having also a display monitor connected to the host computer, a power management system for managing power usage by the display monitor, comprising:

a timer for detecting periods of inactivity at the computer;

a signal generator for generating power-management commands for the display monitor; and a power manager circuit in the display monitor;

wherein, after passage of a pre-stored time period of inactivity of the host computer, the timer signals the signal generator to send a power management command to the display monitor, and the power manager circuit in the display monitor causes the display monitor to assume either one of at least two reduced-power states in response to the power management command.

62. A power-management system as in claim 61 wherein the display monitor has a filament heater, and power is reduced but not suspended to the filament heater in one of the reduced-power states.

63. The power-management system of claim 61 wherein there are two reduced-power states, one of the reduced-power states is off, and the other reduced-power state is an intermediate state between full power and off.

64. The power-management system of claim 63 wherein in said intermediate reduced-power state, power is supplied substantially only to the power manager circuit.

65. The power-management system of claim 63 wherein the power-using circuitry includes a filament heater, and in said intermediate reduced-power state partial power is supplied to the filament heater.

66. The power-management system of claim 61 wherein there are two reduced-power states, and both are intermediate states between full power and off.

67. The power-management system of claim 66 wherein the power-using circuitry includes a filament heater, in one of the reduced-power states power is supplied substantially only to the power manager circuit, and in the other reduced power state partial power is supplied to the filament heater.

68. The power-management system of claim 61 wherein the power manager circuit reduces power to power-using circuitry in the monitor to three reduced-power states.

69. The power-management system of claim 68 wherein one of said three reduced-power states is off and two of said reduced-power states are intermediate states between full power and off.

70. The power-management system of claim 69 wherein the monitor includes a filament heater and in one of the intermediate states partial power is supplied to the filament heater.

71. The power-management system of claim 69 wherein in one of the intermediate states power is supplied substantially only to the power manager circuit.

72. The power-management system of claim 69 wherein the monitor includes a filament heater, in one of the reduced-power states partial power is supplied to the filament heater, and in the other reduced-power state power is supplied substantially only to the power manager circuit.

73. A computer comprising:

a central processing unit (CPU);

a memory connected to the CPU for storing data and instruction routines;

input apparatus coupled to the CPU for a user to provide input to the computer;

a video adapter coupled to the CPU and providing several signals for forming an image on a display monitor;

a timer for detecting periods of inactivity of the input apparatus; and a signal interrupter connected to the several signals provided for forming an image on the display monitor;

wherein the timer, in response to passage of pre-stored periods of inactivity of the input apparatus, signals the signal interrupter to interrupt signals provided for forming an image on the display monitor as power-management commands to the monitor to assume reduced-power states.

74. A computer as in claim 73 wherein the timer comprises control routines executed by the CPU, and the signal interrupter comprises the CPU signaling the video adapter to disable just one of the several signals provided by the video adapter for forming an image on the display monitor.

75. A computer as in claim 74 wherein the control routines are provided in a basic input output system (BIOS) in a programmable read-only memory.

76. A computer as in claim 73 wherein the timer and the signal interrupter are parts of an add-in time-out controller adaptable to an existing computer by connecting to existing signal lines of the computer.

77. A computer as in claim 73 wherein the input apparatus comprises one or more of a keyboard, a modem, and a pointer device, and the timer and the signal interrupter are parts of an add-on time-out controller, wherein the timer is connected to sensing devices interfaced at input ports for the input apparatus, and the signal interrupter is interfaced to a port providing the several signals for forming an image on the display monitor, the signal interrupter having an electrically-operable switch carrying one of the several signals for forming an image on the display monitor, and wherein the sensing devices signal the timer on occurrence of activity of the input apparatus, and the timer signals the signal interrupter to open the electrically-operable switch in response to passage of a pre-stored time period of inactivity of the input apparatus.

78. A computer configured to signal a display monitor to assume alternative power-using states, the computer comprising:

a CPU;

a memory connected to the CPU for storing data and instruction routines;

peripheral devices coupled to the CPU;

a video adapter coupled to the CPU for providing signals for forming images on the display monitor, the signals including at least one color signal, and HSYNC, and VSYNC signals;

a timer for detecting different lengths of time of inactivity of the peripheral devices, measured from a common beginning, and for providing different control signals in response to the different lengths of time of inactivity; and an interrupter circuit for interrupting the signals provided by the video adapter for the display monitor;

wherein the interrupter circuit interrupts the signals to the display monitor in different combinations in response to the different control signals.

79. A computer as in claim 78 wherein the interrupter circuit interrupts one or both of the HSYNC and the VSYNC signals.

80. A computer comprising:

a central processing unit (CPU);

a memory connected to the CPU for storing data and instruction routines;

input apparatus coupled to the CPU for a user to provide input to the computer;

a timer for detecting periods of inactivity of the computer; and a signal generator adapted for sending power management commands to the display monitor;

wherein the timer, in response to passage of pre-stored periods of inactivity of the computer, signals the signal generator to send the power management commands to the display monitor to assume reduced-power states.

81. A computer as in claim 80 wherein the timer comprises control routines executed by the CPU, and the signal generator comprises the CPU signaling a video adapter to disable one of several signals provided by the video adapter for forming an image on the display monitor.

82. A computer as in claim 81 wherein the control routines are provided in a basic input output system (BIOS) in a programmable read-only memory.

83. A computer as in claim 80 wherein the timer and the signal generator are parts of an add-in time-out controller adaptable to an existing computer by connecting to existing signal lines of the computer.

84. A computer as in claim 80 wherein the input apparatus comprises one or more of a keyboard, a modem, and a pointer device, and the timer and the signal generator are parts of an add-on time-out controller, wherein the timer is connected to sensing devices interfaced at input ports for the input apparatus, and the signal generator is interfaced to a port providing signals for forming an image on the display monitor.

85. A display monitor having a port dedicated to receiving color and synchronization signals from a computer, the signals for providing an image on the display monitor, comprising:

a detector for detecting absence of at least one of the signals received from the computer; and a power manager circuit;

wherein the detector sends a command to the power manager circuit on detecting absence of the at least one of the signals received from the computer, and the power manager circuit reduces power to power-using circuitry in the monitor to either one of at least two reduced-power levels in response to the command from the detector.

86. A display monitor as in claim 85 wherein the power-using circuitry comprises a filament heater.

87. A display monitor as in claim 85 wherein the detector comprises a microcontroller executing power management control routines.

88. The display monitor of claim 85 wherein there are two reduced-power levels, one of the reduced-power levels is off, and the other reduced-power level is an intermediate level between full power and off.

89. The display monitor of claim 88 wherein in said intermediate reduced-power level, power is supplied substantially only to the power manager circuit.

90. The display monitor of claim 88 wherein the power-using circuitry includes a filament heater, and in said intermediate reduced-power level partial power is supplied to the filament heater.

91. The display monitor of claim 85 wherein there are two reduced-power levels, and both are intermediate levels between full power and off.

92. The display monitor of claim 91 wherein the power-using circuitry includes a filament heater, in one of the reduced-power levels power is supplied substantially only to the power manager circuit, and in the other reduced power level partial power is supplied to the filament heater.

93. The display monitor of claim 85 wherein the power manager circuit reduced power to power-using circuitry in the monitor to three reduced-power levels.

94. The display monitor of claim 93 wherein one of said three reduced-power levels is off and two of said reduced-power levels are intermediate states between full power and off.

95. The display monitor of claim 94 wherein the monitor includes a filament heater and in one of the intermediate levels partial power is supplied to the filament heater.

96. The display monitor of claim 94 wherein in one of the intermediate levels power is supplied substantially only to the power manager circuit.

97. The display monitor of claim 94 wherein the monitor includes a filament heater, in one of the reduced-power levels partial power is supplied to the filament heater, and in the other reduced-power level power is supplied substantially only to the power manager circuit.

98. A display monitor comprising:

a detector coupled to incoming signals, the incoming signals including horizontal synchronization (HSYNC) and vertical synchronization (VSYNC) signals, conveyed to said display monitor by a host computer; and power level control circuitry responsive to said detector for managing power-using circuitry in said display monitor;

wherein said detector detects absence of one or more of said incoming signals, and said power level control circuitry provides in response one or another of at least two reduced-power states for said display monitor.

99. A display monitor as in claim 98 wherein power is reduced but not suspended to a filament heater in one of the reduced-power states.

100. A display monitor as in claim 98 wherein the detector determines one or more video signals is absent after passage of a predetermined time period with no valid signal present for the one or more video signals.

101. A display monitor as in claim 98 wherein said detector detects absence of one or both the HSYNC and VSYNC signals.

102. A display monitor comprising:

a detector coupled to incoming video signals, the incoming video signals including horizontal synchronization (HSYNC) and vertical synchronization (VSYNC) signals, conveyed to said display monitor by a host computer; and power level control circuitry responsive to said detector for managing power-using circuitry in said display monitor;

wherein said detector detects absence of one or both of said HSYNC and said VSYNC signals, and said power level control circuitry provides in response two reduced-power states for said display monitor one of the reduced-power states delayed for a predetermined period of time after the initiation of the other reduced-power by application of a predetermined time constant.

103. A display monitor having a cathode filament and a filament heater, comprising:

a detector coupled to incoming signals, the incoming signals including horizontal synchronization (HSYNC) and vertical synchronization (VSYNC) signals, conveyed to said display monitor by a host computer; and power level control circuitry responsive to said detector for managing power-using circuitry in said display monitor;

wherein said detector detects absence of one or more of said incoming signals, and said power level control circuitry provides in response either of at least two reduced-power states including an intermediate reduced-power state wherein the filament heater is on.

104. A display monitor having a port for signals for providing an image on the display monitor, comprising:
   a receiver adapted for receiving a power-management command; and
   a power manager circuit;
   wherein the receiver sends a command to the power manager circuit on receiving the power-management command, and the power manager circuit reduces power to power-using circuitry in the monitor to either one of at least two reduced-power levels in response to the command from the receiver.

105. A display monitor as in claim 104 wherein the receiver is adapted for receiving and discriminating among different power-management commands.

106. A display monitor as in claim 105 wherein the power manager reduces power to different reduced-power levels in response to the different power-management commands.

107. A display monitor having a cathode filament and a filament heater, comprising:
   a detector adapted for detecting a power management command conveyed to said display monitor by a host computer; and
   power level control circuitry responsive to said detector for managing power-using circuitry in said cathode ray tube monitor;
   wherein said detector detects said power management command, and said power level control circuitry provides in response one or another of at least two reduced-power states for the display monitor.

108. A method for saving power in operation of a computer system sending signals to a display monitor to provide an image on the display monitor, comprising steps of:
   sensing periods of inactivity of input apparatus of the computer system;
   interrupting one of the signals to the display monitor in response to a period of inactivity of the input apparatus;
   detecting the absence of the signal at the display monitor by detection circuitry;
   signaling power-management circuitry in the display monitor from the detection circuitry that a signal is interrupted; and
   reducing power to power-using circuitry in the monitor to either one of at least two reduced-power states by the power-management circuitry in response to the signal from the detection circuitry.

109. The method of claim 108 wherein in the reducing power step, power is reduced but not suspended to a filament heater in the display monitor.

110. The method of claim 108 wherein in the reducing power step power is suspended to a filament heater in the monitor.

111. The method of claim 108 wherein in the reducing power step, power is reduced to one or another of two reduced-power levels, one of the reduced-power levels is off, and the other reduced-power level is an intermediate level between full power and off.

112. The method of claim 111 wherein in said intermediate reduced-power level, power is supplied substantially only to the power-management circuit.

113. The method of claim 111 wherein the power-using circuitry includes a filament heater, and in said intermediate reduced-power level partial power is supplied to the filament heater.

114. The method of claim 108 wherein in the reducing power step, power is reduced to one or another of two reduced-power levels, and both are intermediate levels between full power and off.

115. The method of claim 114 wherein the power-using circuitry includes a filament heater, in one of the reduced-power levels power is supplied substantially only to the power-management circuit, and in the other reduced power level partial power is supplied to the filament heater.

116. The method of claim 108 wherein in the reducing power step, the power-management circuitry reduces power to power-using circuitry in the monitor to three reduced-power levels.

117. The method of claim 116 wherein one of said three reduced-power levels is off and two of said three reduced-power levels are intermediate levels between full power and off.

118. The method of claim 116 wherein the monitor includes a filament heater and in one of the intermediate power levels partial power is supplied to the filament heater.

119. The method of claim 116 wherein in one of the intermediate power levels power is supplied substantially only to the power-management circuit.

120. The method of claim 116 wherein the monitor includes a filament heater, in one of the reduced-power levels partial power is supplied to the filament heater, and in the other reduced-power level power is supplied substantially only to the power manager circuit.

121. A method for saving power in operation of a computer system wherein a host computer sends signals to a display monitor to provide an image on the display monitor, comprising steps of:
   (a) sensing periods of inactivity of the host computer;
   (b) sending a power-management command to the monitor in response to a period of inactivity of the host computer;
   (c) detecting the power-management command at the display monitor by detection circuitry;
   (d) signaling power-management circuitry in the display monitor from the detection circuitry that a power-management command is received; and
   (e) reducing power to power-using circuitry in the monitor to either one of at least two reduced-power levels by the power-management circuitry in response to the signal from the detection circuitry.

122. The method of claim 121 wherein in the reducing power step, power is reduced but not suspended to a filament heater in the display monitor.

123. The method of claim 121 wherein in the reducing power step power is suspended to a filament heater in the monitor.

124. The method of claim 121 wherein, in step (b), different power-management commands are sent according to different lengths of inactivity of the host computer in step (a), the different lengths of time measured from a common beginning.

125. The method of claim 124 wherein alternative distinct reduced-power states are provided according to the different lengths of time of inactivity.

126. The method of claim 121 wherein in the reducing power step, power is reduced to one or another of two reduced-power levels, one of the reduced-power levels is off, and the other reduced-power level is an intermediate level between full power and off.

127. The method of claim 126 wherein in said intermediate reduced-power level, power is supplied substantially only to the power-management circuit.

128. The method of claim 126 wherein the power-using circuitry includes a filament heater, and in said intermediate reduced-power level partial power is supplied to the filament heater.

129. The method of claim 87 wherein in the reducing power step, power is reduced to one or another of two reduced-power levels, and both are intermediate levels between full power and off.

130. The method of claim 129 wherein the power-using circuitry includes a filament heater, in one of the reduced-power levels power is supplied substantially only to the power-management circuit, and in the other reduced power level partial power is supplied to the filament heater.

131. The method of claim 121 wherein in the reducing power step, the power-management circuitry reduces power to power-using circuitry in the monitor to three reduced-power levels.

132. The method of claim 131 wherein one of said three reduced-power levels is off and two of said three reduced-power levels are intermediate levels between full power and off.

133. The method of claim 131 wherein the monitor includes a filament heater and in one of the intermediate power levels partial power is supplied to the filament heater.

134. The method of claim 131 wherein in one of the intermediate power levels power is supplied substantially only to the power-management circuit.

135. The method of claim 131 wherein the monitor includes a filament heater, in one of the reduced-power levels partial power is supplied to the filament heater, and in the other reduced-power level power is supplied substantially only to the power manager circuit.

136. In a computer having circuitry providing several signals to a display monitor for providing an image on the display monitor, a method for signaling the display monitor to assume alternative power-using states, comprising steps of:

detecting periods of inactivity of input apparatus coupled to the computer; and interrupting one or more of the several signals to the display monitor in response to detecting the periods of inactivity of the input apparatus as power-management commands to the display monitor to assume alternative power-using states.

137. In a computer having peripheral devices and providing signals to a display monitor, a method for signaling the display monitor to assume alternative reduced-power states, comprising steps of:

detecting different lengths of time of inactivity of the peripheral devices, the different lengths of time measured from a common beginning; and interrupting signals to the display monitor in different patterns in response to the different lengths of time of inactivity as power-management commands to the display monitor to assume reduced-power states;

wherein the signals to the display monitor are interrupted in a first pattern in response to a first length of time of inactivity, and in a second pattern in response to a second length of time of inactivity.

138. In a computer having circuitry providing signals to a display monitor for providing an image on the display monitor, a method for signaling the display monitor to assume alternative power-using states, comprising steps of:

(a) detecting different lengths of time of inactivity of the computer, the different lengths of time having a common beginning; and (b) sending power management commands to the video monitor to assume alternative power states in response to detecting the different lengths of time of inactivity of the computer.

139. A method for directing assumption of alternative power-using states in a display monitor having a port with individual conductors dedicated to receiving several separate signals for providing an image on the display monitor, comprising steps of:

detecting the absence of one or more of the signals sent for providing an image by signal detection circuitry in the monitor;

signaling power-management circuitry in the display monitor from the detection circuitry that the one or more signals are absent; and reducing power to power-using circuitry in the monitor by the power-management circuitry to either one of at least two reduced-power levels in response to the signal from the detection circuitry.

140. The method of claim 139 wherein in the reducing power step, power is reduced to one of two reduced-power levels, one of the reduced-power levels is off, and the other reduced-power level is an intermediate level between full power and off.

141. The method of claim 140 wherein in said intermediate reduced-power level, power is supplied substantially only to the power-management circuitry.

142. The method of claim 140 wherein the power-using circuitry includes a filament heater, and in said intermediate reduced-power level partial power is supplied to the filament heater.

143. The method of claim 139 wherein in the reducing power step, power is reduced to one of two reduced-power levels, and both are intermediate levels between full power and off.

144. The method of claim 143 wherein the power-using circuitry includes a filament heater, in one of the reduced-power levels power is supplied substantially only to the power-management circuitry, and in the other reduced power level partial power is supplied to the filament heater.

145. The method of claim 139 wherein in the reducing power step, the power-management circuitry reduces power to power-using circuitry in the monitor to three reduced-power levels.

146. The method of claim 145 wherein one of said three reduced-power levels is off and two of said three reduced-power levels are intermediate levels between full power and off.

147. The method of claim 145 wherein the monitor includes a filament heater and in one of the intermediate power levels partial power is supplied to the filament heater.

148. The method of claim 145 wherein in one of the intermediate power levels power is supplied substantially only to the power-management circuit.

149. The method of claim 145 wherein the monitor includes a filament heater, in one of the reduced-power levels partial power is supplied to the filament heater, and in the other reduced-power level power is supplied substantially only to the power manager circuit.

150. A method for directing assumption of alternative reduced-power states in a display monitor configured to receive incoming signals including horizontal synchronization (HSYNC) and vertical synchronization (VSYNC) signals, conveyed to said display monitor by a host computer, the method comprising steps of:

detecting absence of one or both of the HSYNC and the VSYNC signals; and directing assumption of one or another of at least two reduced-power states in response to the detecting of absence of one or both of the HSYNC and VSYNC signals.

151. The method of claim 150 wherein in the directing assumption step, power is reduced to one of two reduced-power states, one of the reduced-power states is off, and the other reduced-power state is an intermediate state between full power and off.

152. The method of claim 151 wherein in said intermediate reduced-power state, power is supplied substantially only to the power-management circuitry.

153. The method of claim 151 wherein the display monitor includes a filament heater, and in said intermediate reduced-power state partial power is supplied to the filament heater.

154. The method of claim 150 wherein in the directing step, one of two reduced-power states is assumed, and both reduced-power states are intermediate states between full power and off.

155. The method of claim 154 wherein the display monitor includes a filament heater and a power-manager circuit, and in one of the reduced-power states power is supplied substantially only to the power-management circuit, and in the other reduced power state partial power is supplied to the filament heater.

156. The method of claim 150 wherein in the directing step, one of three reduced-power states is assumed.

157. The method of claim 156 wherein one of said three reduced-power states is off and two of said three reduced-power states are intermediate states between full power and off.

158. The method of claim 156 wherein the monitor includes a filament heater and in one of the intermediate reduced-power states partial power is supplied to the filament heater.

159. The method of claim 156 wherein the display monitor comprises a power-manager circuit, and in one of the intermediate power states power is supplied substantially only to the power-manager circuit.

160. The method of claim 156 wherein the display monitor includes a filament heater and a power manager circuit, in one of the reduced-power states partial power is supplied to the filament heater, and in the other reduced-power state power is supplied substantially only to the power manager circuit.

161. A method for directing assumption of alternative power-using states in a display monitor, comprising steps of:
  detecting a power-management command sent to the display monitor from a host computer; and
  signaling power-management circuitry in the monitor to assume reduced-power states in response to the power-management command.

162. The method of claim 161 wherein one or more of the reduced power states are assumed after a time delay following detection of the power management command.

163. The method of claim 161 wherein there are two reduced-power states, one of the reduced-power states is off, and the other reduced-power state is an intermediate state between full power and off.

164. The method of claim 163 wherein the monitor comprises power-management circuitry, and in said intermediate reduced-power state, power is supplied substantially only to the power-management circuitry.

165. The method of claim 163 wherein the display monitor includes a filament heater, and in said intermediate reduced-power state partial power is supplied to the filament heater.

166. The method of claim 161 wherein there are two reduced-power states, and both reduced-power states are intermediate states between full power and off.

167. The method of claim 166 wherein the display monitor includes a filament heater and a power-manager circuit, in one of the reduced-power states power is supplied substantially only to the power-manager circuit, and in the other reduced-power state partial power is supplied to the filament heater.

168. The method of claim 161 wherein there are three reduced-power states.

169. The method of claim 168 wherein one of said three reduced-power states is off and two of said three reduced-power states are intermediate states between full power and off.

170. The method of claim 168 wherein the display monitor includes a filament heater and in one of the intermediate reduced-power states partial power is supplied to the filament heater.

171. The method of claim 168 wherein the display monitor comprises a power-manager circuit, and in one of the intermediate power states power is supplied substantially only to the power-manager circuit.

172. The method of claim 168 wherein the display monitor includes a filament heater and a power manager circuit, in one of the reduced-power states partial power is supplied to the filament heater, and in the other reduced-power state power is supplied substantially only to the power manager circuit.

173. An add-in time-out control unit adaptable to circuitry of an existing computer, the add-in time-out control unit comprising:
  a timer interfaced to signals from input apparatus connected to the computer; and
  a signal interrupter comprising an electrically-operable switch in line with one of several signals provided by a video adapter for forming an image on a display monitor connectable to the computer;
  wherein the timer signals the electrically-operable switch to open in response to passage of a pre-stored time period of inactivity of the input apparatus, providing a power management command to the display monitor.

174. An add-on time-out controller for a computer having input apparatus comprising one or more of a keyboard, a modem, and a pointer device connected to input ports at the computer, the add-on time-out controller comprising:
  sensing devices interfaced at the input ports for the input apparatus;
  a timer coupled to the sensing devices; and
  a signal interrupter interfaced to an output port providing several signals for forming an image on a display monitor, the signal interrupter having an electrically-operable switch in a line carrying one of the several signals to the video monitor;
  wherein the sensing devices signal the timer on occurrence of activity of the input apparatus, and the timer signals the signal interrupter to open the electrically-operable switch in response to passage of a prestored time period of inactivity of the input apparatus, providing power-management command to the display monitor.

* * * * *